(12) United States Patent
Bokich

(10) Patent No.: US 6,953,331 B2
(45) Date of Patent: Oct. 11, 2005

(54) POSITIONING DEVICE WITH BEARING MECHANISM

(75) Inventor: Michael S. Bokich, El Paso, TX (US)

(73) Assignee: Extreme Components L.P., El Paso, TX (US)

( * ) Notice: Subject to any disclaimer, the term of this patent is extended or adjusted under 35 U.S.C. 154(b) by 89 days.

(21) Appl. No.: 10/649,069

(22) Filed: Aug. 27, 2003

(65) Prior Publication Data

US 2004/0043103 A1     Mar. 4, 2004

Related U.S. Application Data

(60) Provisional application No. 60/407,324, filed on Aug. 30, 2002.

(51) Int. Cl.[7] .................. B29C 33/20; B29C 45/64
(52) U.S. Cl. .................. 425/192 R; 425/451.9
(58) Field of Search ................ 425/190, 192 R, 425/451.9, 472, 589

(56) References Cited

U.S. PATENT DOCUMENTS

| | | | |
|---|---|---|---|
| 4,678,158 A | 7/1987 | Brock | 249/161 |
| 4,750,876 A | 6/1988 | Lawson | |
| 5,490,317 A | 2/1996 | Kubert | |
| 5,762,977 A | 6/1998 | Boskovic | 425/225 |
| 6,558,145 B2 | 5/2003 | Wieder | 425/107 |
| 2002/0044983 A1 * | 4/2002 | Wieder | 425/192 R |

* cited by examiner

Primary Examiner—Donald Heckenberg
(74) Attorney, Agent, or Firm—Howard & Howard

(57) ABSTRACT

A positioning device for aligning and guiding first and second mold halves together is provided. The positioning device includes a first member defining an alignment axis and having a male portion. The first member is mounted to the first mold half. A second member is separable from the first member and defines a female portion for mating with the male portion along the alignment axis to align the first and second mold halves together. The second member is mounted to the second mold half. The male portion presents a first bearing surface and the female portion presents a second bearing surface. A cage that rotatably supports a plurality of needle bearings reduces friction along the bearing surfaces when mating the members together along the alignment axis. A spring resiliently supports the cage.

28 Claims, 5 Drawing Sheets

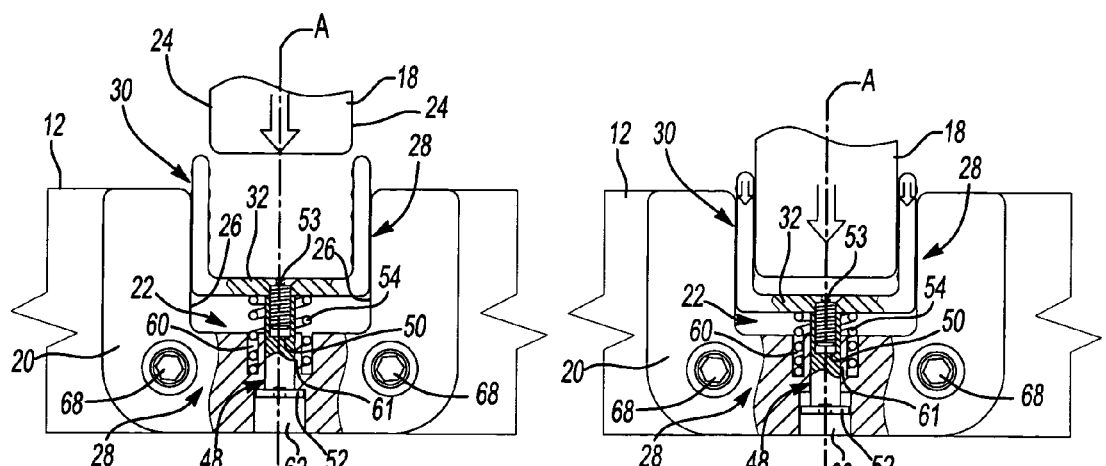
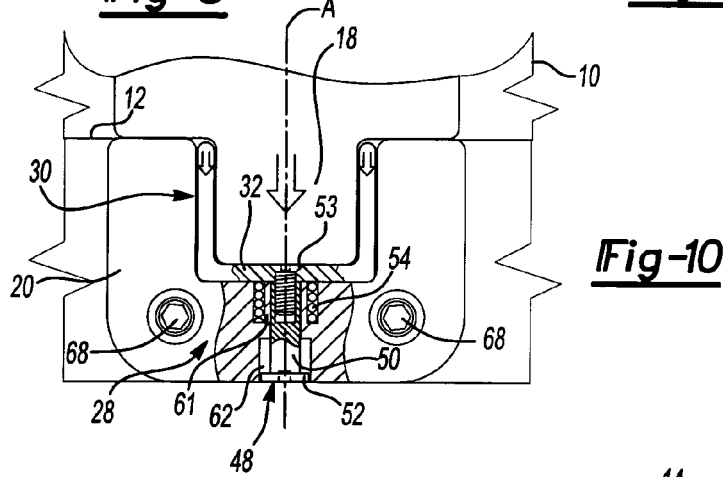
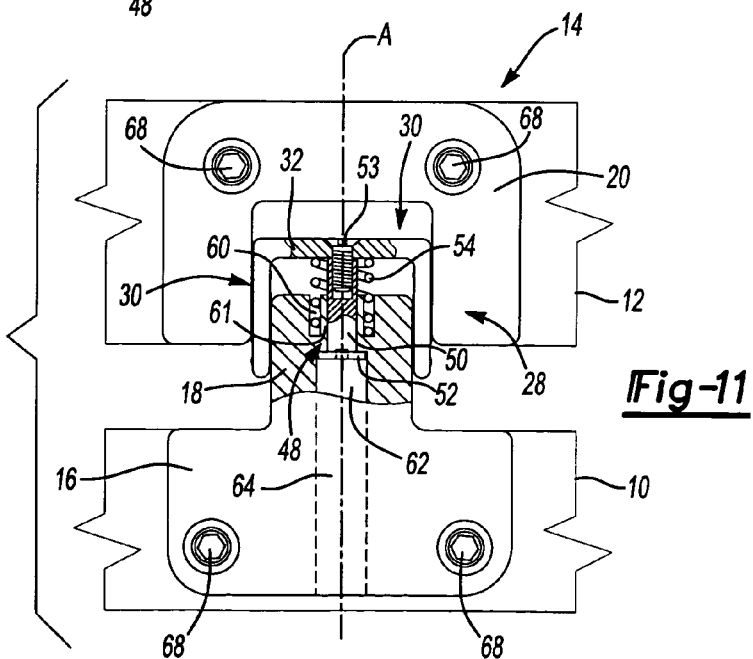

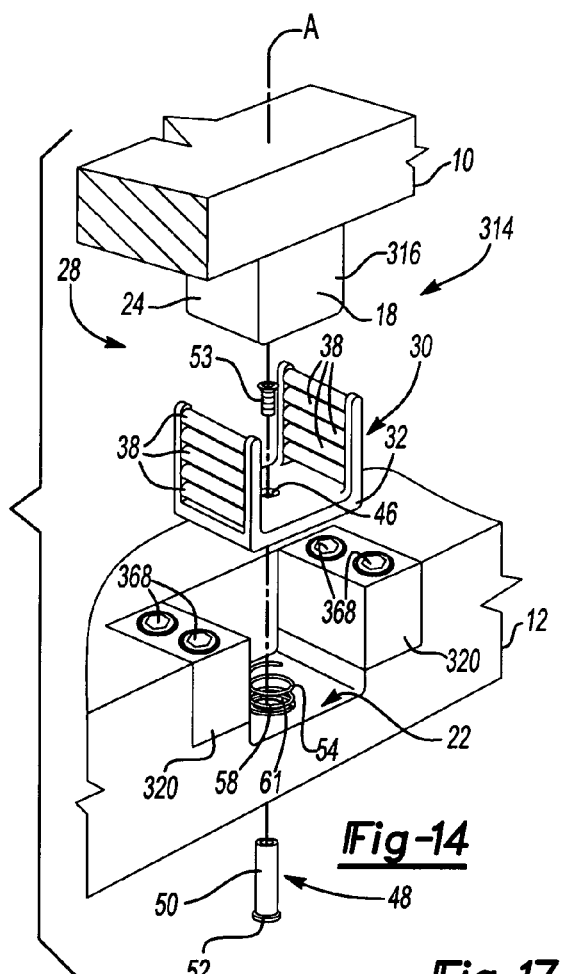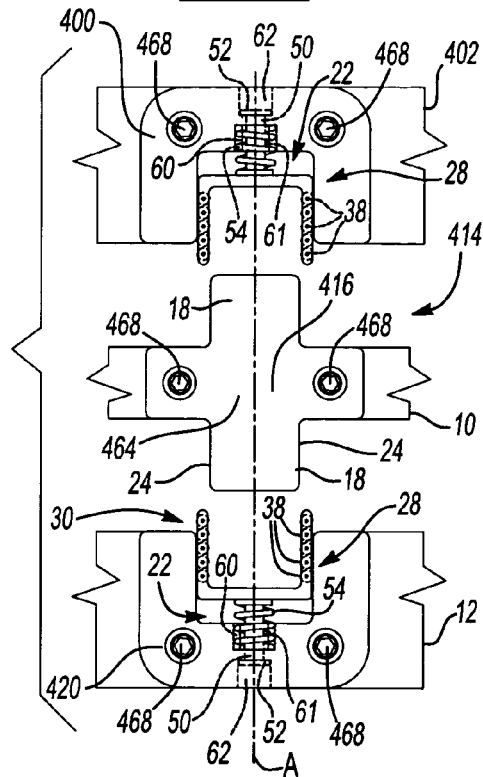

POSITIONING DEVICE WITH BEARING MECHANISM

RELATED APPLICATIONS

This application claims the benefit of U.S. provisional patent application ser. no. 60/407,324, filed Aug. 30, 2002.

FIELD OF THE INVENTION

The present invention relates to a positioning device for aligning and guiding two halves of a mold together. More specifically, the present invention relates to the positioning device having a bearing mechanism to facilitate aligning and guiding the two halves while reducing wear of the positioning device.

BACKGROUND OF THE INVENTION

In a typical molding process, two halves of a mold are closed together to define a cavity and material is injected into the cavity to form a product. During the molding process, the two halves are repeatedly opened and closed to form multiple products. Molding processes are used in many industries. In many of these industries, the products being formed must meet rigorous standards and specifications. Hence, the tolerance for misalignment between the mold halves during the molding process is generally small.

Positioning devices are used to reduce tolerances between the mold halves to form products that meet the appropriate standards and specifications for each industry. A typical positioning device comprises a first member attached to one of the mold halves and a second member attached to the other mold half. The first member has a male portion that engages a female portion of the second member when the mold halves are closed together. An example of such a positioning device is shown in U.S. Pat. No. 5,762,977 to Boskovic.

The fit between the male and female portions of the members determines the magnitude of misalignment between the mold halves. In prior art positioning devices, the male portion includes a first pair of bearing surfaces and the female portion includes a second pair of bearing surfaces. The bearing surfaces of the male portion slide against the bearing surfaces of the female portion to provide a better fit when aligning and guiding the mold halves together. As a result, these bearing surfaces are susceptible to wear. Consequently, as demand for higher productivity increases, the speed of the molding process increases thereby increasing the wear along the bearing surfaces of prior art positioning devices.

Traditionally, when the bearing surfaces became worn, the positioning devices would be replaced. This resulted in increased cost and unacceptable delays in production. To solve this problem, the prior art has introduced the use of replaceable inserts in the positioning devices. This improvement is illustrated in U.S. Pat. No. 6,558,145 to Wieder. Wieder discloses a positioning device for a mold having a pair of separable mold halves. The positioning device includes a base mounted to one mold half and a head extending from the base. A receptacle is mounted to the other mold half and a pocket is defined in the receptacle for receiving the head. The head defines a plurality of channels with needle bearings disposed therein. The needle bearings bear against a sidewall of the pocket when the head is inserted into the pocket thereby reducing friction in the mating engagement of the head and pocket. The needle bearings are replaceable to reduce down time and increase productivity.

BRIEF SUMMARY OF THE INVENTION

The present invention provides a positioning device for aligning and guiding first and second mold halves together. The positioning device comprises a first member defining an alignment axis and having a male portion. The first member is mounted to the first mold half. A second member that is separable from the first member is mounted to the second mold half. A female portion defined by the second member mates with the male portion of the first member along the alignment axis to align the first and second mold halves together. The male portion presents a first bearing surface and the female portion presents a second bearing surface. A bearing mechanism reduces friction along the bearing surfaces of the members when mating the members together along the alignment axis. As the members mate, the bearing mechanism moves between first and second positions relative to at least one of the members. A resilient member resiliently supports the bearing mechanism between the first and second positions.

The positioning device of the present invention provides several advantages over the prior art. In particular, by allowing the bearing mechanism to move between first and second positions relative to at least one of the members when the members mate together, the amount of wear along the bearing surfaces is substantially reduced thereby significantly increasing the cycles of operation for the positioning device. This results in less down time and increased productivity. At the same time, the magnitude of misalignment between the mold halves is sustained at a negligible level.

BRIEF DESCRIPTION OF THE SEVERAL VIEWS OF THE DRAWINGS

Advantages of the present invention will be readily appreciated as the same becomes better understood by reference to the following detailed description when considered in connection with the accompanying drawings wherein:

FIG. 8 is a partially cut-away elevational view of the positioning device with the bearing mechanism in a first position;

FIG. 9 is a partially cut-away elevational view of the positioning device with the bearing mechanism between the first and second positions as a first member of the positioning device mates with a second member of the positioning device;

FIG. 10 is a partially cut-away elevational view of the positioning device with the bearing mechanism in the second position;

FIG. 11 is an elevational view of an alternative embodiment of the positioning device;

FIG. 14 is an perspective view of a third alternative embodiment of the positioning device;

FIG. 15 is an elevational view of a fourth alternative embodiment of the positioning device;

FIG. 16 is an elevational view of an alternative bearing mechanism embodied in first and second side locks;

FIG. 17 is a partially cut-away top view of the alternative bearing mechanism; and FIG. 18 is an elevational view of another alternative bearing mechanism embodied in first and second side locks.

DETAILED DESCRIPTION OF THE INVENTION

Figure 1:
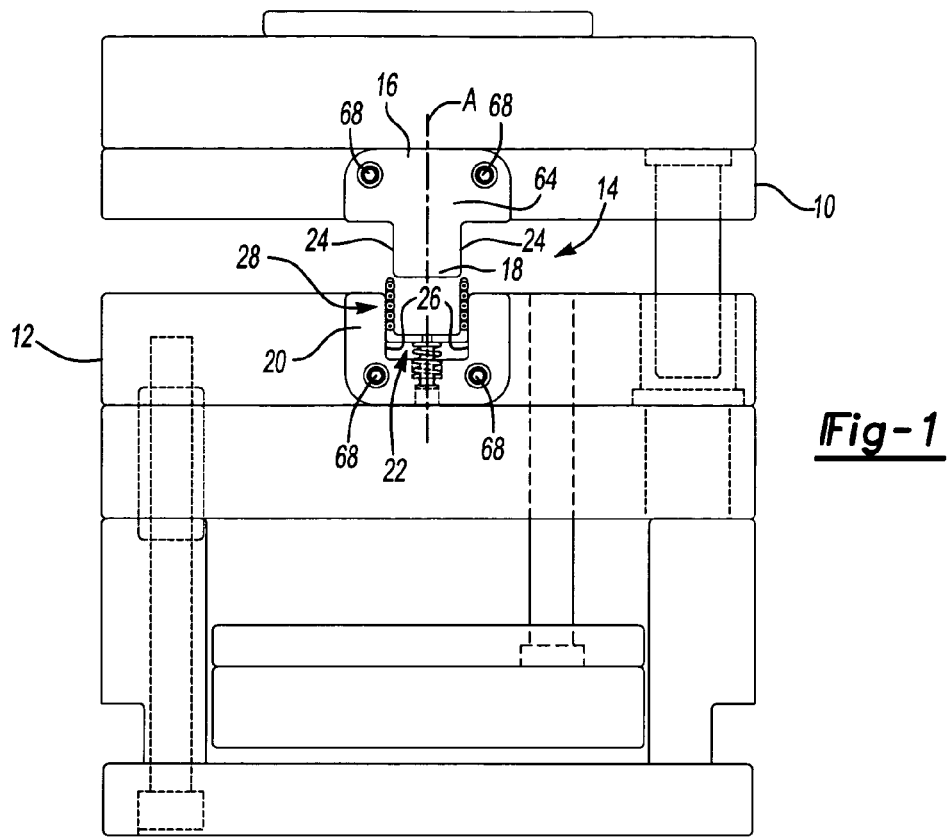
FIG. 1 is a elevational view illustrating use of a positioning device of the present invention to align and guide first and second mold halves together.

Referring to the Figures, wherein like numerals indicate like or corresponding parts throughout the several views, a positioning device for aligning and guiding first 10 and second 12 mold halves together is generally shown at 14. The mold halves 10,12 could be used in injection molding processes, metal stamping processes, or any other forming process in which alignment between two portions is required for operation.

The positioning device 14 of the present invention can be embodied in several types of well-known locking systems. For purposes of illustration, the positioning device 14 shall be shown as side locks 14, top locks 114, rectangular locks 214, guide locks 314, and x-type side locks 414. These types of locking systems are well known to those skilled in the art for aligning first 10 and second 12 mold halves together. However, as a starting point, those features of the positioning device 14 that are common to each locking system shall first be described.

Figure 2:
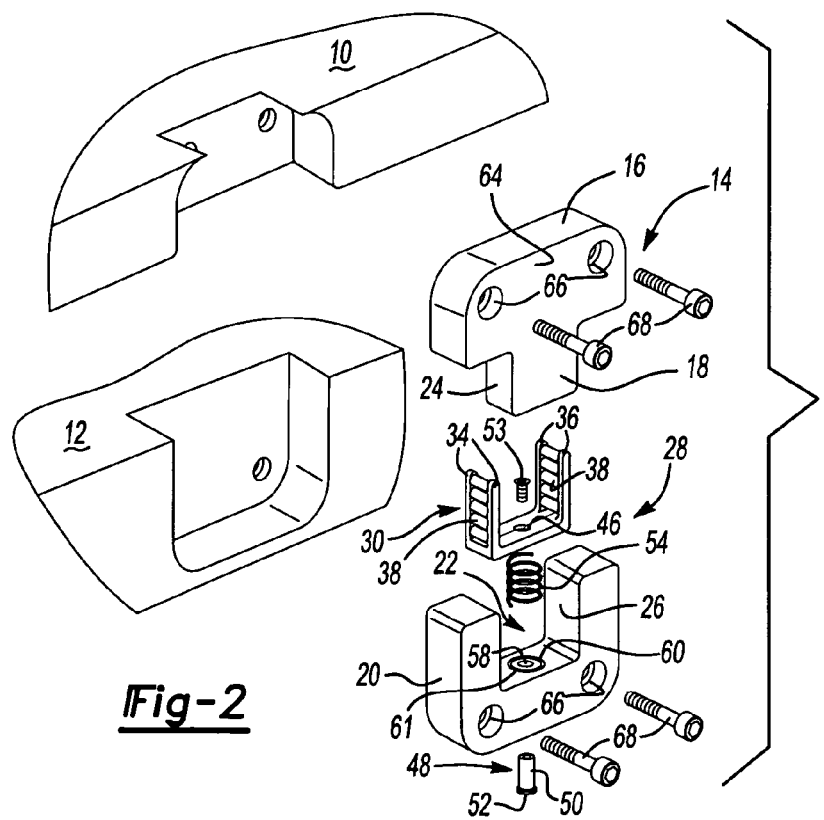
FIG. 2 is an exploded view of the positioning device.

Referring to FIGS. 1 and 2, the positioning device 14 includes a first member 16 defining an alignment axis A and having a male portion 18. The first member 16 is mounted to the first mold half 10. A second member 20 is separable from the first member 16 and defines a female portion 22 for mating with the male portion 18 along the alignment axis A to align the first 10 and second 12 mold halves together. The second member 20 is mounted to the second mold half 12. The male portion 18 presents a first pair of bearing surfaces 24 and the female portion 22 presents a second pair of bearing surfaces 26. The first 16 and second 20 members are preferably made from hardened tool steel.

Figure 3:
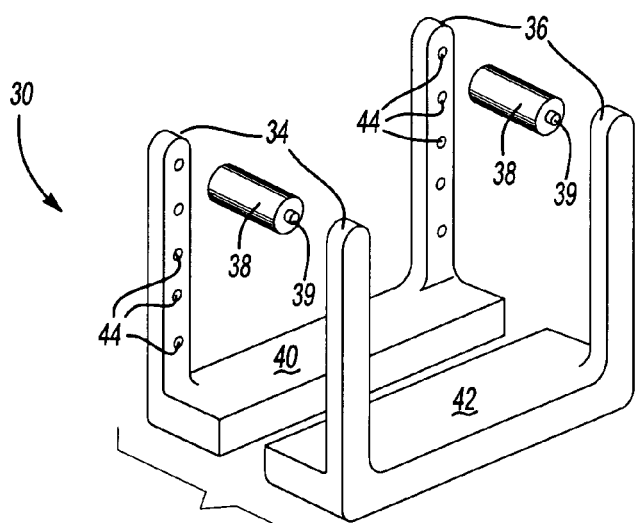
FIG. 3 is an assembly view of a cage of a bearing mechanism of the positioning device.
Figure 4:
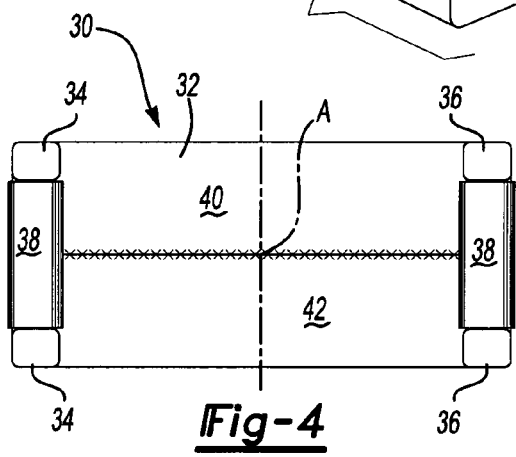
FIG. 4 is a top view of the cage illustrating welding of the cage.
Figure 5:
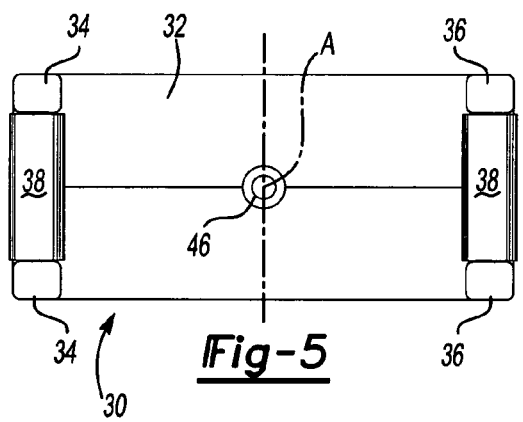
FIG. 5 is a top view of the cage illustrating a chamfered bore within the cage.

A bearing mechanism 28 reduces friction along the bearing surfaces 24,26 when mating the members 16,20 together along the alignment axis A. The bearing mechanism 28 moves between first and second positions along the alignment axis A and relative to at least one of the members 16,20 when the members 16,20 mate together. Referring to FIGS. 3–5, the bearing mechanism 28 includes a cage 30. The cage 30 has a bottom wall 32, a first pair of columns 34 extending from the bottom wall 32, and a second pair of columns 36 extending from the bottom wall 32. The second pair of columns 36 are spaced from and parallel to the first pair of columns 34. As appreciated by those skilled in the art, the cage 30 may be formed from steel or plastic material.

The bearing mechanism 28 further includes a first plurality of needle bearings 38 rotatably supported between the first pair of columns 34 and a second plurality of needle bearings 38 rotatably supported between the second pair of columns 36. Each of the needle bearings includes pins 39 on opposing ends thereof. The pins 39 engage recesses 44 defined in the first 34 and second 36 pairs of columns. The recesses 44 do not extend entirely through the columns 34,36. To do so would substantially weaken the cage 30. Instead, the recesses 44 act as pockets for rotatably supporting the pins 39. The first and second pluralities of needle bearings 38 are equidistant from the alignment axis A, as shown in FIGS. 4 and 5.

To manufacture the cage 30, first 40 and second 42 halves of the cage 30 are brought together and welded. See FIGS. 3 and 4. This sandwiches the needle bearings 38 for rotatable support within the recesses 44 and between the two halves 40,42. The bottom wall 32 of the cage 30 is then bored with a chamfered bore 46, as shown in FIG. 5.

Alternatively, the cage 30 could be injection molded plastic having one or two piece construction. In two piece construction, the cage 30 would be assembled as previously described, i.e., by molding the two halves 40,42 and joining the two halves 40,42 using any suitable welding process. In one piece construction, the cage 30 would be over-molded onto the needle bearings 38 using processes well known to those skilled in the injection molding arts. In this instance, steel inserts (not shown) could be added to fortify the recesses 44.

Figure 6:
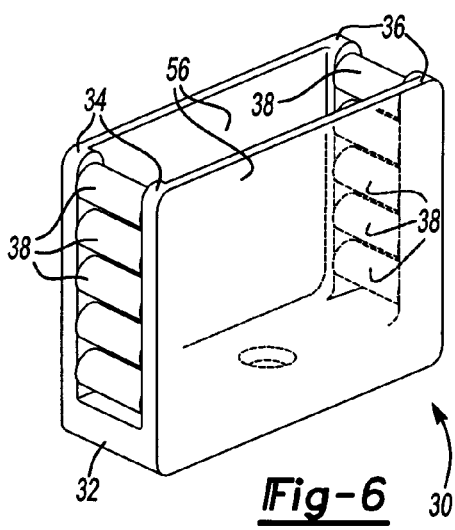
FIG. 6 is a perspective view of the cage having a reinforcement wall.
Figure 7:
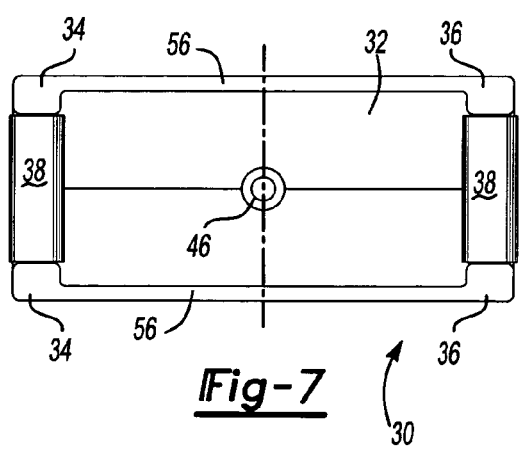
FIG. 7 is a top view of the cage with the reinforcement wall.

Referring to FIGS. 6 and 7, a pair of reinforcement walls 56 extend between the first 34 and second 36 pairs of columns. The reinforcement walls 56 are used to fortify the cage 30 in certain applications. The reinforcement walls 56 may be positioned along an entire length of the first 34 and second 36 pairs of columns and extend to the bottom wall 32 of the cage 30. Alternatively, the reinforcement walls 56 may be ribs (not shown) extending between only a portion of the length of the first 34 and second 36 pairs of columns thereby leaving a gap between the reinforcement walls 56 and the bottom wall 32 of the cage 30.

Referring back to FIG. 2, the bearing mechanism 28 further includes a retaining pin 48 having a body portion 50 coupled to the cage 30 and a head portion 52 adjacent to the body portion 50. The retaining pin 48 is coupled to the cage 30 by way of a fastener 53 such as a flat head screw or the like. The fastener 53 threadably engages a threaded bore (not shown) in the retaining pin 48 through the chamfered bore 46.

A resilient member 54 resiliently supports the bearing mechanism 28 between the first and second positions. The resilient member 54 is preferably a spring 54 surrounding the retaining pin 48 and having first and second ends. The spring 54 may be made from steel or a polymer such as urethane. The resilient member 54 could also comprise a positive locating device operating by friction.

Referring to FIGS. 2 and 8, the cage 30 is preferably coupled to the second member 20. In this instance, the second member 20 defines a first bore 58 having a first diameter and the body portion 50 of the retaining pin 48 is slideably disposed therein. The second member 20 defines an annular chamber 60 surrounding the first bore 58 and the first end of the spring 54 is disposed in the annular chamber 60 about the retaining pin 48. A support wall 61 partitions the first bore 58 and the annular chamber 60 to further support the retaining pin 48 in the first bore 58. The second end of the spring 54 abuts the bottom wall 32 of the cage 30 about the retaining pin 48. In addition, the second member 20 defines a second bore 62 adjacent to the first bore 58 and having a second diameter greater than the first diameter of the first bore 58. The head portion 52 is slidably disposed in the second bore 62. The fastener 53 couples the body portion 50 of the retaining pin 48 to the bottom wall 32 of the cage 30.

Referring to FIGS. 8–10, operation of the positioning device 14 is illustrated. As shown, the male portion 18 of the first member 16 mates with the female portion 22 of the second member 20 when closing the mold halves 10,12 together. See FIG. 10. When this occurs, the cage 30 is sandwiched between the members 16,20 thereby moving the cage 30 between the first and second positions. The first and second positions are represented in FIGS. 8 and 10, respectively. Arrows on the cage 30 in FIGS. 9 and 10 illustrate movement of the cage 30. FIG. 9 indicates that the cage 30 may move slightly relative to the second member 20 prior to mating contact with the male portion 18. In other instances, however, the cage 30 may remain stationary relative to the second member 20 until engaged by the male portion 18. In either instance, when the cage 30 moves from the first position to the second position, the spring 54 is compressed and the retaining pin 48 slides downwardly within the first bore 58.

The male portion 18 of the first member 16 slides into the cage 30 along the alignment axis A and between the first and second pluralities of needle bearings 38 when the first 16 and second 20 members mate together. This is represented by arrows on the male portion 18 in FIGS. 9 and 10. As the members 16,20 mate and sandwich the cage 30 therebetween, the needle bearings 38 roll along the bearing surfaces 24, 26 of the male 18 and female 22 portions. This action minimizes wear along the bearing surfaces 24, 26. At the same time, the needle bearings 38 snugly fit between the bearing surfaces 24, 26 to minimize the magnitude of misalignment between the members 16, 20 and, consequently, the mold halves 10, 12. When the mold halves are opened, i.e., the members 16, 20 are separated, the cage 30 is released back to the first position.

Referring to FIG. 11, the cage 30 may alternatively be coupled to the male portion 18. In this instance, the first member 16 defines the first bore 58 and the body portion 50 of the retaining pin 48 is slidably disposed therein. The first member 16 also defines the annular chamber 60 and the first end of the spring 54 is disposed in the annular chamber 60 about the retaining pin 48. The second end of the spring 54 abuts the bottom wall 32 of the cage 30 about the retaining pin 48. In addition, the first member 16 defines the second bore 62 adjacent to the first bore 58. The second bore 62 has a second diameter greater than the first diameter of the first bore 58. The head portion 52 is slidably disposed in the second bore 62. The fastener 53 couples the retaining pin 48 to the bottom wall 32 of the cage 30. When the cage 30 is coupled to the male portion 18, the cage 30 is inverted. Hence, the chamfer of the chamfered bore 46 is reversed in the bottom wall 32.

In the preferred embodiment illustrated in FIGS. 1, 2, and 8–10, the first 16 and second 20 members are further defined as first 16 and second 20 side locks. Referring specifically to FIG. 2, the first side lock 16 comprises a unitary body having a main body portion 64 with the male portion 18 extending therefrom to form a generally T shape. The main body portion 64 defines two counterbores 66 perpendicular to the alignment axis A to receive fasteners 68 for mounting the first side lock to the first mold half 10. The second side lock 20 comprises a unitary body having a generally U shape and defining two counterbores 66 perpendicular to the alignment axis A to receive fasteners 68 for mounting the second side lock 20 to the second mold half 12.

Figure 12:
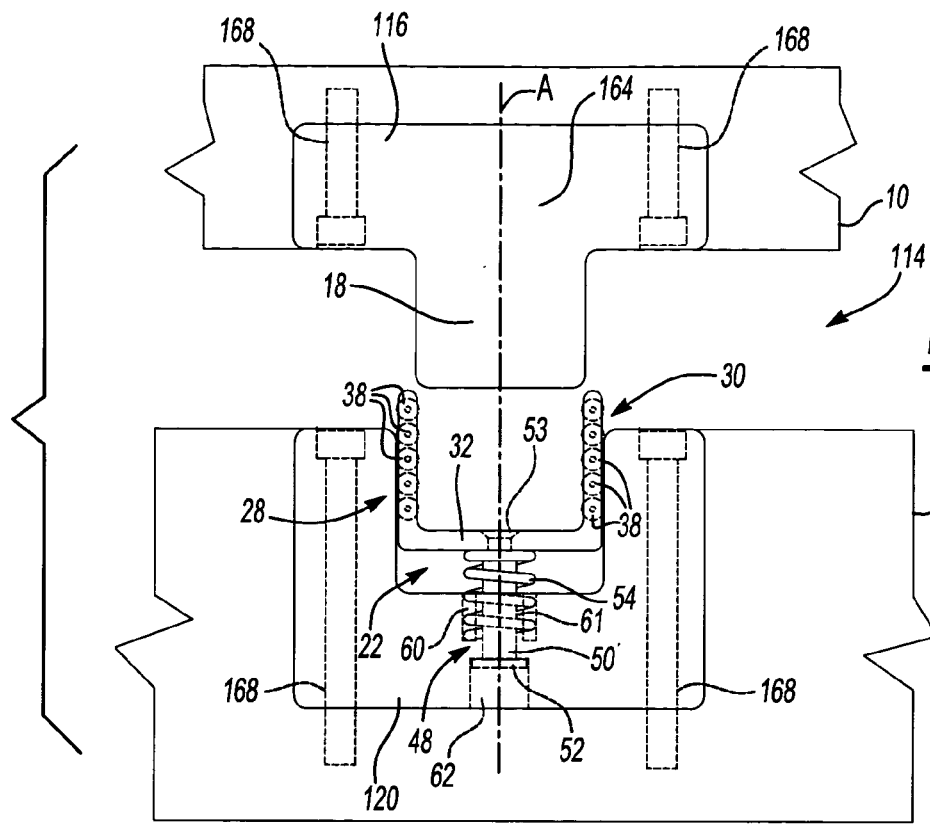
FIG. 12 is an elevational view of a first alternative embodiment of the positioning device.

A first alternative embodiment 114 is illustrated in FIG. 12. Here, the first 16 and second 20 members are further defined as first 116 and second 120 top locks. The first top lock 116 comprises a unitary body having a main body portion 164 with the male portion 18 extending therefrom to form a generally T shape. The main body portion 164 defines two counterbores (not shown) parallel to the alignment axis A to receive fasteners 168 for mounting the first top lock 116 to the first mold half 10. The second top lock 120 comprises a unitary body having a generally U shape and defining two counterbores (not shown) parallel to the alignment axis A to receive fasteners 168 for mounting the second top lock 120 to the second mold half 12.

Figure 13:
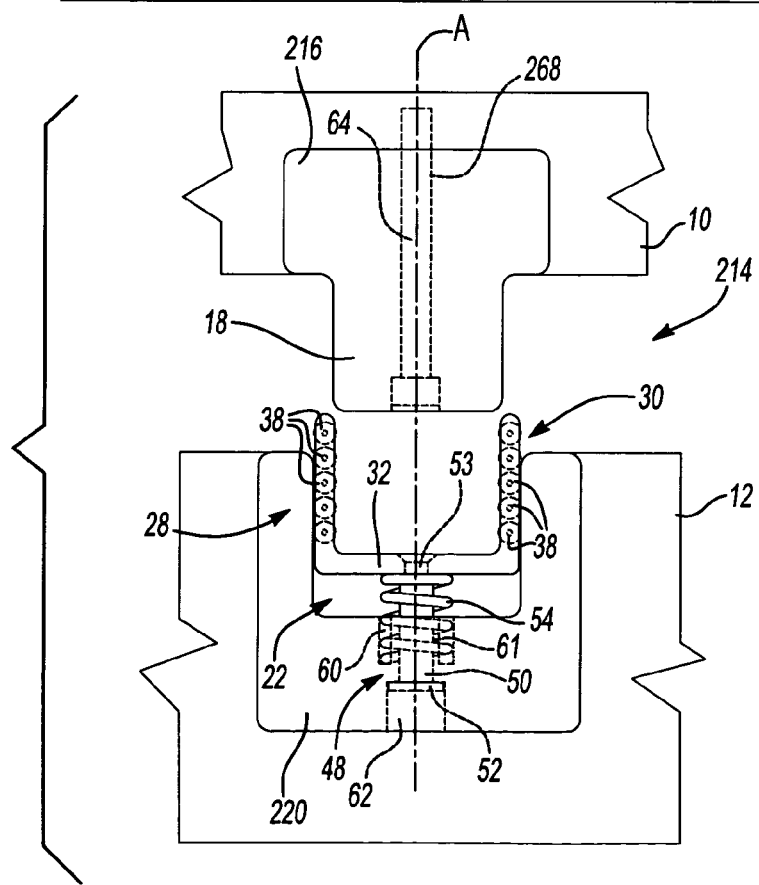
FIG. 13 is an elevational view of a second alternative embodiment of the positioning device.

A second alternative embodiment 214 is illustrated in FIG. 13. Here, the first 16 and second 20 members are further defined as first 216 and second 220 rectangular locks. The first rectangular lock 216 comprises a unitary body having a generally T shape and defining two counterbores (not shown) parallel to the alignment axis A to receive fasteners 268 for mounting the first rectangular lock 216 to the first mold half 10. The second rectangular lock 220 comprises a unitary body having a generally U shape and defining two counterbores (not shown) parallel to the alignment axis A to receive fasteners (not shown) for mounting the second rectangular lock 220 to the second mold half 12.

A third alternative embodiment 314 is illustrated in FIG. 14. Here, the first member 16 is further defined as a top guide block 316 and the second member 20 is further defined as a pair of bottom guide blocks 320 spaced from one another to define the female portion 22 therebetween. In this embodiment, the spring 54 is positioned in the second mold half 12 to resiliently support the cage 30 when mating the top guide block 316 with the pair of bottom guide blocks 320. Each of the blocks 316,320 define a pair of counterbores (not shown) parallel to the alignment axis A to receive fasteners 368 for mounting the blocks 316,320 to the first 10 and second 12 mold halves. Of course, as with all other embodiments, the cage 30 could be supported by the male portion 18 of the top guide block 316, as shown in the first side lock 16 of FIG. 11.

A fourth alternative embodiment 414 is illustrated in FIG. 15. Here, a third member 400 is added and the first 16, second 20, and third 400 members are further defined as first 416, second 420, and third 400 x-type side locks. The third member 400 defines a female portion 22 and the first side lock 416 includes a second male portion 18 for mating with the female portion 22 of the third member 400. A second bearing mechanism 28, identical to the first 28, is interposed between the first 416 and third 400 side locks. A second resilient member 54 resiliently supports the second bearing mechanism 28 between first and second positions.

In this embodiment, the first side lock 416 comprises a unitary body having a main body portion 464 with the first and second male portions 18 extending therefrom to form a generally cross shape. The main body portion 464 defines two counterbores (not shown) perpendicular to the alignment axis A to receive fasteners 468 for mounting the first side lock 416 to the first mold half 10. The second 420 and third 400 side locks each comprise a unitary body having a generally U shape and defining two counterbores (not shown) perpendicular to the alignment axis A to receive fasteners 468 for mounting the second side lock 420 to the second mold half 12 and mounting the third side lock 400 to a third mold half 402. The first 416 and second 420 side locks align and guide the first 10 and second 12 mold halves together and the first 416 and third 400 side locks align and guide the first 10 and third 402 mold halves together.

In the alternative embodiments illustrated in FIGS. 12–15, the bearing mechanisms 28 (e.g., cages 30, retaining pins 48, and fasteners 53), and springs 54 are substantially identical in configuration and positioning as the preferred embodiment of FIGS. 1, 2, and 8–10.

Alternative bearing mechanisms 528a,528b are illustrated in two alternative embodiments 514a,514b in FIGS. 16–18. The alternative bearing mechanisms 528a,528b are shown in first 516 and second 520 side locks. In the embodiment 514a of FIG. 16, the second side lock 520 defines semi-circular recesses 586. In the embodiment 514b of FIG. 18, the first side lock 516 defines the semi-circular recesses 586. The bearing mechanisms 528a,528b comprise a plurality of roller bearings 588 rotatably supported within the semi-circular recesses 586. As illustrated in FIGS. 16 and 17, the roller bearings 588 are rotatably supported in the semi-circular recesses 586 of the second side lock 520. Alternatively, in FIG. 18, the roller bearings 588 are rotatably supported within the semi-circular recesses 586 in the first side lock 516. Each of the roller bearings 588 define a bore (not shown) therethrough for receiving a support pin 590. Each support pin 590 provides for rotation of the roller bearings 588 about an axis. In the embodiment of FIGS. 16 and 17, the roller bearings 588 co-act with a female portion 522 to reduce friction along first bearing surfaces 524 of a male portion 518. In the embodiment of FIG. 18, the roller bearings 588 co-act with the male portion 518 to reduce friction along second bearing surfaces 526 of the female portion 522.

In a typical molding operation, several of the positioning devices 14 may be used to align and guide the first 10 and second 12 mold halves together. In addition, each of the embodiments described herein are for illustrative purposes only. Additional embodiments of the present invention can be contemplated that keep with the spirit of the present invention. Obviously, many modifications and variations of the present invention are possible in light of the above teachings. The invention may be practiced otherwise than as specifically described within the scope of the appended claims.

What is claimed is:

1. A positioning device for aligning and guiding first and second mold halves together, comprising;
    a first member defining an alignment axis and having a male portion,
    a second member separable from said first member and defining a female portion for mating with said male portion along said alignment axis to align the first and second mold halves together,
    said male portion presenting a first bearing surface and said female portion presenting a second bearing surface,
    a bearing mechanism for reducing friction along said bearing surfaces when mating said members together along said alignment axis as said bearing mechanism moves between first and second positions relative to at least one of said members, and
    a resilient member for resiliently supporting said bearing mechanism between said first and second positions.

2. A positioning device as set forth in claim 1 wherein said bearing mechanism includes a cage having a bottom wall, a first pair of columns extending from said bottom wall, and a second pair of columns extending from said bottom wall and spaced from and parallel to said first pair of columns.

3. A positioning device as set forth in claim 2 wherein said bearing mechanism further includes a first plurality of needle bearings rotatably supported between said first pair of columns and a second plurality of needle bearings rotatably supported between said second pair of columns wherein said first and second pluralities of needle bearings are equidistant from said alignment axis.

4. A positioning device as set forth in claim 3 wherein said male portion of said first member is slidable within said cage along said alignment axis and between said first and second pluralities of needle bearings.

5. A positioning device as set forth in claim 4 wherein said bearing mechanism further includes a retaining pin having a body portion coupled to said cage and a head portion adjacent said body portion.

6. A positioning device as set forth in claim 5 wherein said resilient member is further defined as a spring surrounding said retaining pin and having first and second ends for resiliently supporting said cage between said first and second positions.

7. A positioning device as set forth in claim 6 wherein said second member defines a first bore having a first diameter and said body portion of said retaining pin is slideably disposed therein.

8. A positioning device as set forth in claim 7 wherein said second member defines an annular chamber surrounding said first bore and said first end of said spring is disposed in said annular chamber about said retaining pin and said second end of said spring abuts said bottom wall of said cage about said retaining pin.

9. A positioning device as set forth in claim 8 wherein said second member defines a second bore adjacent to said first bore and having a second diameter greater than said first diameter of said first bore with said head portion being slidably disposed in said second bore.

10. A positioning device as set forth in claim 9 further including a fastener coupling said body portion of said retaining pin to said bottom wall of said cage.

11. A positioning device as set forth in claim 10 further including a pair of reinforcement walls extending between said first and second pairs of columns.

12. A positioning device as set forth in claim 10 wherein said first and second members are further defined as first and second side locks and said first side lock comprises a unitary body having a main body portion with said male portion extending therefrom to form a generally T shape and said main body portion defines two counterbores perpendicular to said alignment axis for mounting said first side lock to the first mold half and said second side lock comprises a unitary body having a generally U shape and defining two counterbores perpendicular to said alignment axis for mounting said second side lock to the second mold half.

13. A positioning device as set forth in claim 10 wherein said first and second members are further defined as first and second rectangular locks and said first rectangular lock comprises a unitary body having a generally T shape and defining two counterbores parallel to said alignment axis for mounting said first rectangular lock to the first mold half and said second rectangular lock comprises a unitary body having a generally U shape and defining two counterbores parallel to said alignment axis for mounting said second rectangular lock to the second mold half.

14. A positioning device as set forth in claim 10 wherein said first and second members are further defined as first and second top locks and said first top lock comprises a unitary body having a main body portion with said male portion extending therefrom to form a generally T shape and said main body portion defines two counterbores parallel to said alignment axis for mounting said first top lock to the first mold half and said second top lock comprises a unitary body having a generally U shape and defining two counterbores parallel to said alignment axis for mounting said second top lock to the second mold half.

15. A positioning device as set forth in claim 6 wherein said first member defines a first bore and said body portion of said retaining pin is slidably disposed therein.

16. A positioning device as set forth in claim 15 wherein said first member defines an annular chamber and said first end of said spring is disposed in said annular chamber about said retaining pin and said second end of said spring abuts said bottom wall of said cage about said retaining pin.

17. A positioning device as set forth in claim 16 wherein said first member defines a second bore adjacent to said first bore and having a second diameter greater than said first diameter of said first bore and said body portion is slidably disposed in said second bore.

18. A positioning device as set forth in claim 17 further including a fastener for coupling said retaining pin to said bottom wall of said cage.

19. A positioning device as set forth in claim 18 wherein said first member is further defined as a top guide block and said second member is further defined as a pair of bottom guide blocks spaced from one another to define said female portion therebetween whereby said spring is coupled to said top guide block to resiliently support said cage in mating engagement with said pair of bottom guide blocks.

20. A positioning device as set forth in claim 18 wherein said first and second members are further defined as first and second side locks and said first side lock comprises a unitary body having a main body portion with said male portion extending therefrom to form a generally T shape and said main body portion defines two counterbores perpendicular to said alignment axis for mounting said first side lock to the first mold half and said second side lock comprises a unitary body having a generally U shape and defining two counterbores perpendicular to said alignment axis for mounting said second side lock to the second mold half.

21. A positioning device as set forth in claim 18 wherein said first and second members are further defined as first and second rectangular locks and said first rectangular lock comprises a unitary body having a generally T shape and defining two counterbores parallel to said alignment axis for mounting said first rectangular lock to the first mold half and said second rectangular lock comprises a unitary body having a generally U shape and defining two counterbores parallel to said alignment axis for mounting said second rectangular lock to the second mold half.

22. A positioning device as set forth in claim 18 wherein said first and second members are further defined as first and second top locks and said first top lock comprises a unitary body having a main body portion with said male portion extending therefrom to form a generally T shape and said main body portion defines two counterbores parallel to said alignment axis for mounting said first top lock to the first mold half and said second top lock comprises a unitary body having a generally U shape and defining two counterbores parallel to said alignment axis for mounting said second top lock to the second mold half.

23. A positioning device as set forth in claim 6 wherein said first member is further defined as a top guide block and said second member is further defined as a pair of bottom guide blocks spaced from one another to define said female portion therebetween whereby said spring is coupled to one of said mold halves to resiliently support said cage when mating said top guide block with said pair of bottom guide blocks.

24. A positioning device as set forth in claim 9 further including a third member defining a female portion wherein said first member includes a second male portion for mating with said female portion of said third member.

25. A positioning device as set forth in claim 24 further including a second bearing mechanism interposed between said first and third members and a second resilient member for resiliently supporting said second bearing mechanism between first and second positions.

26. A positioning device as set forth in claim 25 wherein said first, second, and third members are further defined as first, second, and third side locks and said first side lock comprises a unitary body having a generally cross shape and a main body portion defining two counterbores perpendicular to said alignment axis for mounting said first side lock to the first mold half and said second and third side locks each comprise a unitary body having a generally U shape and defining two counterbores perpendicular to said alignment axis for mounting said second side lock to the second mold half and mounting said third side lock to a third mold half such that said first and second side locks align and guide the first and second mold halves together and said first and third side locks align and guide the first and third mold halves together.

27. A positioning device for aligning and guiding first and second mold halves together, comprising:
  a first member defining an alignment axis and having a male portion,
  a second member separable from said first member and defining a female portion for mating with said male portion along said alignment axis to align the first and second mold halves together,
  a cage separable from and engagable by said members and including a plurality of needle bearings for reducing wear of said members when mating said members together along said alignment axis wherein said cage includes a bottom wall, a first pair of columns extending from said bottom wall, and a second pair of columns extending from said bottom wall and said plurality of needle bearings are further defined as a first plurality of needle bearings rotatably supported between said first pair of columns and a second plurality of needle bearings rotatably supported between said second pair of columns.

28. A positioning device as set forth in claim 27 further including a spring resiliently supporting said cage.

* * * * *